Nov. 29, 1960  S. W. WHEELER  2,961,901
AUTOMATIC CONTROL FOR ADJUSTING ROLLING MILLS
Filed Jan. 16, 1956  8 Sheets-Sheet 1

INVENTOR.
STEPHEN W. WHEELER
BY
ATTORNEY

Nov. 29, 1960 S. W. WHEELER 2,961,901
AUTOMATIC CONTROL FOR ADJUSTING ROLLING MILLS
Filed Jan. 16, 1956 8 Sheets-Sheet 3

INVENTOR.
STEPHEN W. WHEELER
BY
ATTORNEY

Nov. 29, 1960 S. W. WHEELER 2,961,901
AUTOMATIC CONTROL FOR ADJUSTING ROLLING MILLS
Filed Jan. 16, 1956 8 Sheets-Sheet 4

INVENTOR.
STEPHEN W. WHEELER
BY
ATTORNEY

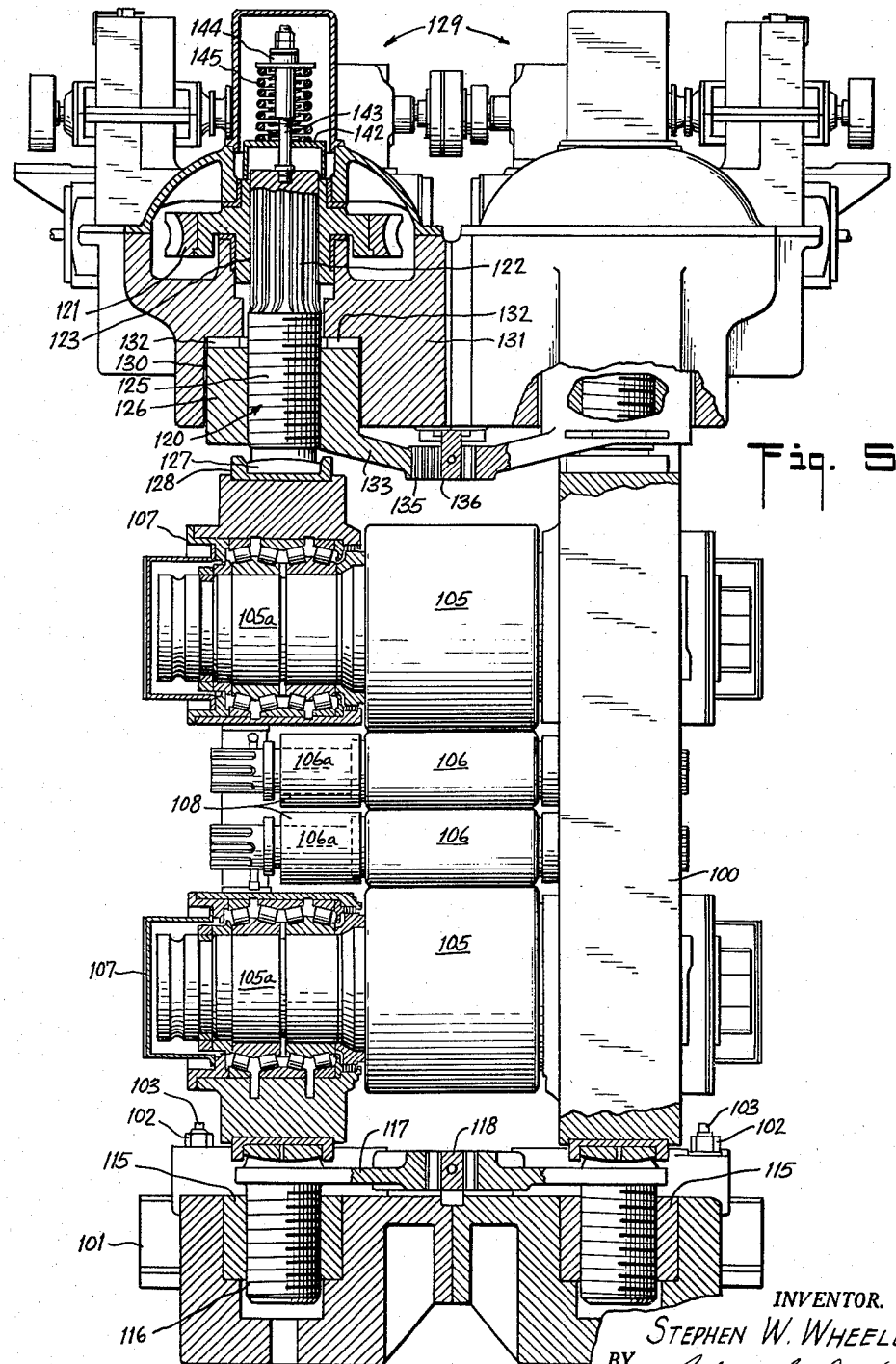

Nov. 29, 1960 S. W. WHEELER 2,961,901
AUTOMATIC CONTROL FOR ADJUSTING ROLLING MILLS
Filed Jan. 16, 1956 8 Sheets-Sheet 6

INVENTOR.
STEPHEN W. WHEELER
BY
ATTORNEY

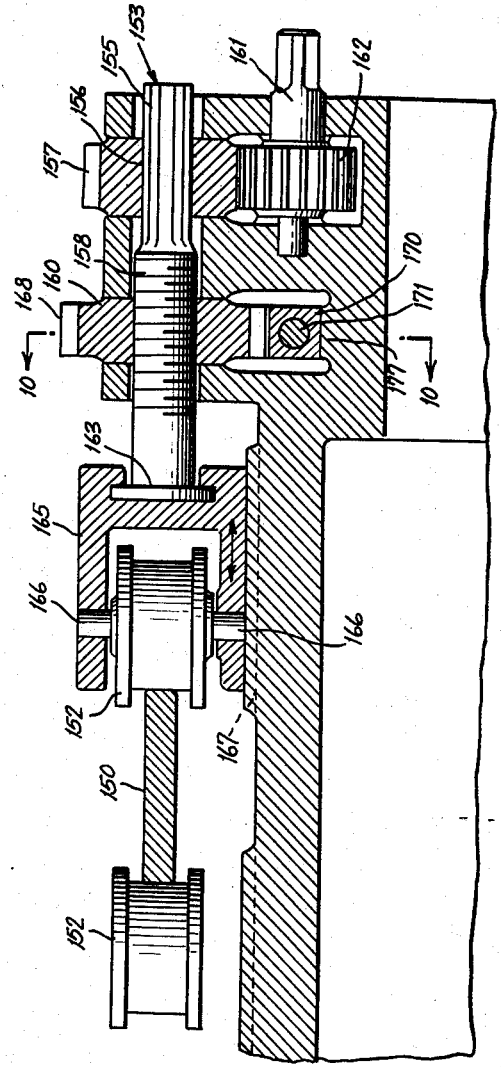
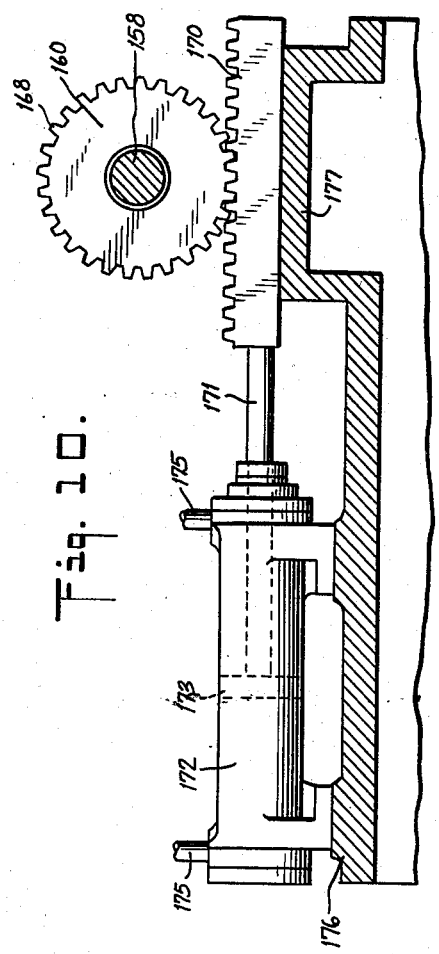
Fig. 9.
Fig. 10.
INVENTOR.
STEPHEN W. WHEELER
BY
ATTORNEY

United States Patent Office 2,961,901
Patented Nov. 29, 1960

2,961,901

AUTOMATIC CONTROL FOR ADJUSTING ROLLING MILLS

Stephen W. Wheeler, 4033 Hudson Drive, Youngstown, Ohio, assignor of one-eighth to Francis J. Klempay, Canfield, Ohio Filed Jan. 16, 1956, Ser. No. 559,349

7 Claims. (Cl. 80—56)

This invention relates to improvements in the rolling of metal and more particularly relates to a method and apparatus for continuously and automatically maintaining constant the separating distance between the rolls of rolling mills during actual rolling operations, so as to obtain a product of more uniform dimensions. In a more general sense, the invention is concerned with the provision of rapid adjustment or modification of roll position at any desired time, for the attainment of various advantages such as explained below.

In rolling mills, it has been customary to provide screw-down means for adjusting the separating distance between the coacting rolls. However, the conventional electric motor driven screw-down has been relatively slow in operation due to the high gear ratio between screw-down motors and the screw adjustment members which regulate the separating distance. Furthermore, that type of screw-down adjustment means has not been designed for continuous adjustment and if so operated would be subject to increased maintenance and possible motor and brake failure.

In the modern practice of high speed rolling, the requirements for quick response to control the gauge of the product have become increasingly more important, in order that a product of uniform thickness and/or width can be produced.

Furthermore, during rolling operations, frequent delays are caused by the breaking of the strip which is being rolled or by strip cobbles (deformations of the strip) or by failure of the mill accessories which requires the stopping of the mills with the strip in the rolls. It is desirable when such stopping occurs that the mill screw pressure be relieved immediately; for example, if the mill is equipped with sleeve-type bearings, considerable damage to the bearings may result, unless the rolls are unloaded, because the oil film squeezes out from between the sleeve bearing and the roll neck at the line of greatest pressure. Upon subsequent starting of the mill, the bearing tends to seize, with resulting damage to the bearing and roll neck. Unloading the mill with the conventional screw-down apparatus requires a considerable period of time because of high gear reduction ratio.

In present mill practice, adjustments have been made to control the gauge thickness of the metal by the use of non-contact thickness gauges which read continuously. Means have also been provided to initiate a thickness reading at given intervals in the strip travel and make the necessary correction in the separating distance of the rolls by energizing the conventional screw-down motors. However, to avoid over-correction, the amount of automatic adjustment in this type of system has been only one-half of the required adjustment indicated by the gauge. While the improvement that this device has made in the finished product is a considerable advance over prior practice, it has only served to emphasize the difficulties of automatically, continually controlling the thickness, for although non-contact thickness gauges capable of continuously recording the thickness have been available, there has been no means of continuously adjusting the screw-down apparatus in rapid response to the changes indicated by the thickness gauge. A difficulty with the present control is that before any correction is made the electric motors for operating the screw-downs must be accelerated from rest and must act through a double worm reduction ratio of approximately 1550:1 to the mill screws; the slow response which results permits a considerable amount of strip to pass through the mill before any change in the separating distance of the rolls is effected. In addition to the time lag in effecting the adjustment, it is also generally conceded that even the most modern rolling mill screw-downs are not designed for such continuous and constant operation, for the turning and reversing of the mill screw results in terrific pressure at the ends of the screw where there is no adequate method of lubrication. Also the continuous starting, stopping and acceleration of the motor increases the maintenance costs.

Therefore, it is an important object of this invention to provide a means for maintaining the separating distance between the rolls constant by continuously correcting any deviations of the rolls from such constant separating distance to obtain uniformly dimensioned product from the metal passing between the rolls. Such changes must be made quickly, almost simultaneously, as changes in the separating distance occur.

Another object of the invention is to allow the immediate release of the screw-down pressure when the mill is stopped to prevent damage to the mill and to quickly reset the same separating distance as before the release as soon as the mill is restarted, to reduce the amount of mill down time, and also to reduce the starting torque.

A still further object of the invention is to provide an improved roll setting adjustment means which may be incorporated in existing equipment.

A still further object of the invention is to provide a means for continuously rapidly adjusting the screw-down apparatus by separate power means which does not require the acceleration and braking of standard large motive equipment for the screw-down which would be subject to breakdown by such continuous use.

Another object, to accomplish uniform rolling, is to provide automatic controls for continuously and rapidly actuating the adjustment means.

The invention may be briefly described as an adjustment means for continuously changing the roll setting adjustments in rapid response to changes in thickness or width of the work leaving the mill, while the latter is in operation, and also for quickly releasing pressure when the mill is stopped and rapidly reapplying pressure when the mill is restarted. The power source for this adjustment means may be separate and distinct from the standard screw-down apparatus, although it may operate on parts of such apparatus.

For a more complete description of the invention, reference is made to the drawings wherein:

Fig. 5 is a front view of the mill shown in Fig. 4 with parts cut away to show the details of the apparatus;

Fig. 9 is a sectional view of a form of apparatus embodying this invention for controlling the width of the metal; and Fig. 10 is a view taken along the lines 10—10 in Fig. 9.

Figure 1:
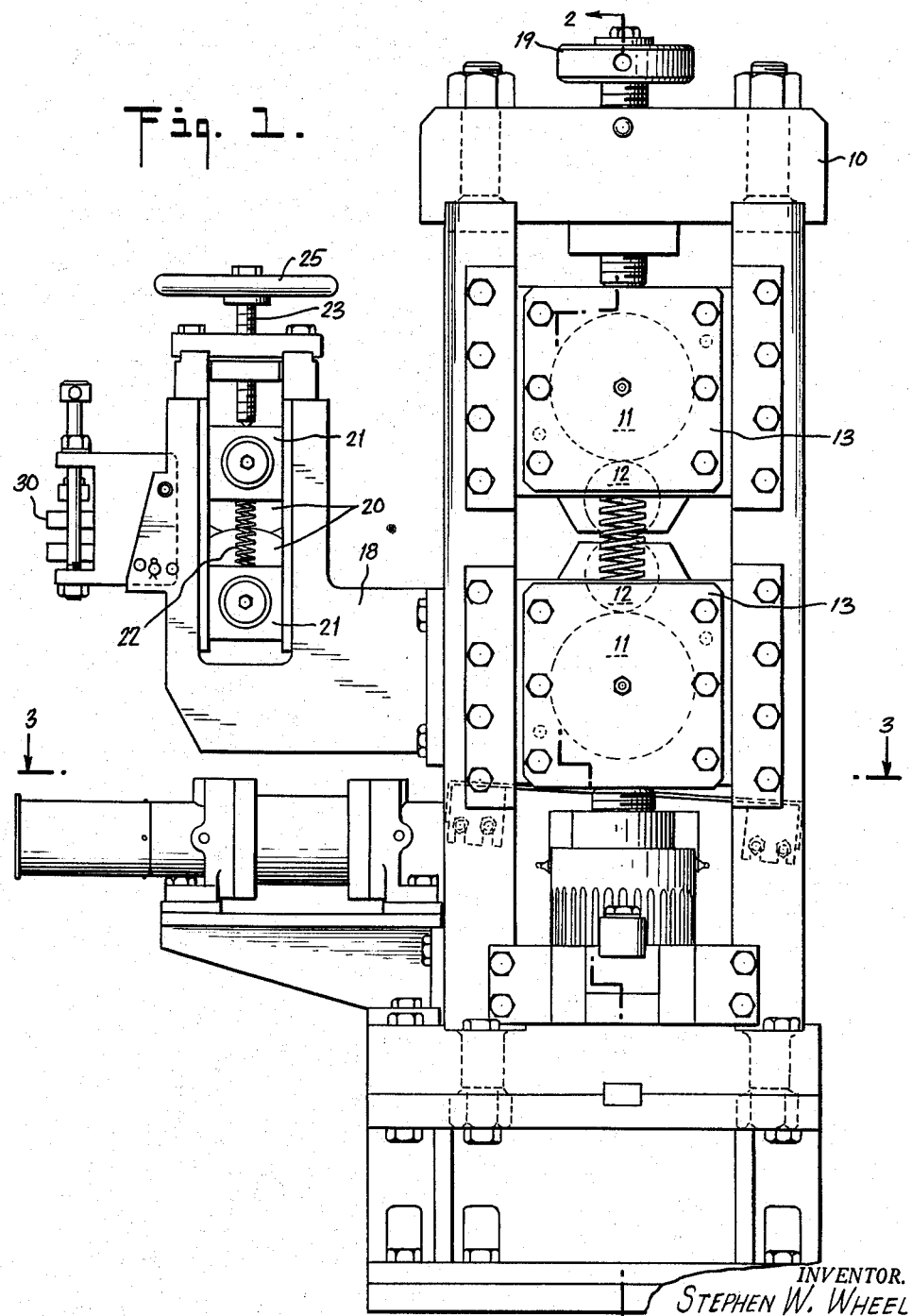
Fig. 1 is a side view of a standard rolling mill in which apparatus embodying one form of this invention is included.
Figure 2:
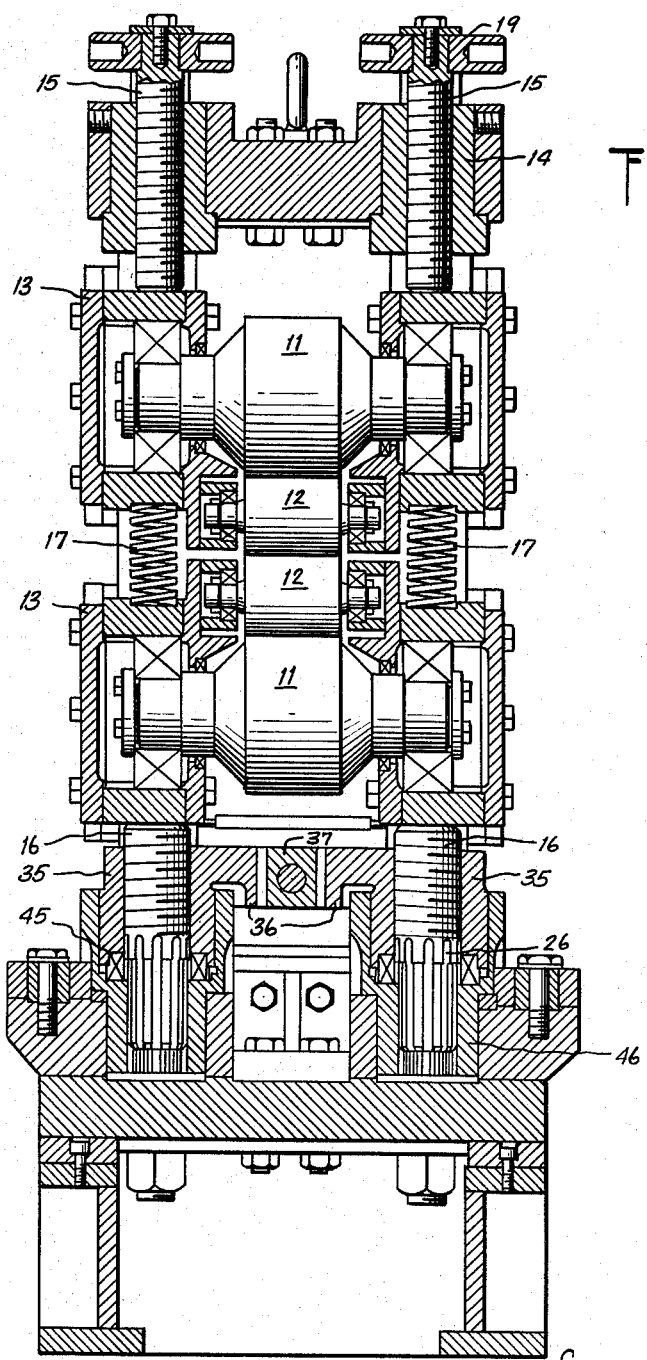
Fig. 2 is a longitudinal (vertical) sectional view taken along the lines 2—2 in Fig. 1.

Referring to Figs. 1 and 2, the apparatus shown is a rolling mill for rolling metal strip; the mill comprises a frame 10, backing up rolls 11 and work rolls 12, each pair of work and backing up rolls being supported in bearing boxes 13 which are adjustable toward and away from each other so as to vary the distance between the work rolls 12. The bearing boxes 13 are mounted for vertical adjustment in the frame 10 and upper screw-down means 15 of a conventional type may be provided at the upper end of the frame 10 to move the bearing box for the upper rolls so that the latter are urged toward or into contact, or more particularly the desired operating relation, with the lower rolls. The lower bearing boxes may be supported on lower screw-down members consisting of threaded columns 16. Compression springs 17 are provided between the bearing boxes 13 to exert a separating force sufficient to separate the rolls 12 when the screw-down pressure is relieved.

Bridle means for controlling the strip of metal as it passes between the rolls 12 may be provided. The bridle means may include a bracket 18 fixed to the frame 10, and guiding rollers 20 supported in the vertically adjustable journal boxes 21. Compression springs 22 are positioned between the journal boxes 21 and tend to separate the rollers 20. Suitable screw means as indicated at 23 are provided for relative adjustment of the journal boxes into the desired condition of engagement of the rollers 20, a hand wheel 25 being provided to operate the screw means 23. A wiper block apparatus shown at 30 may also be provided.

Figure 3:
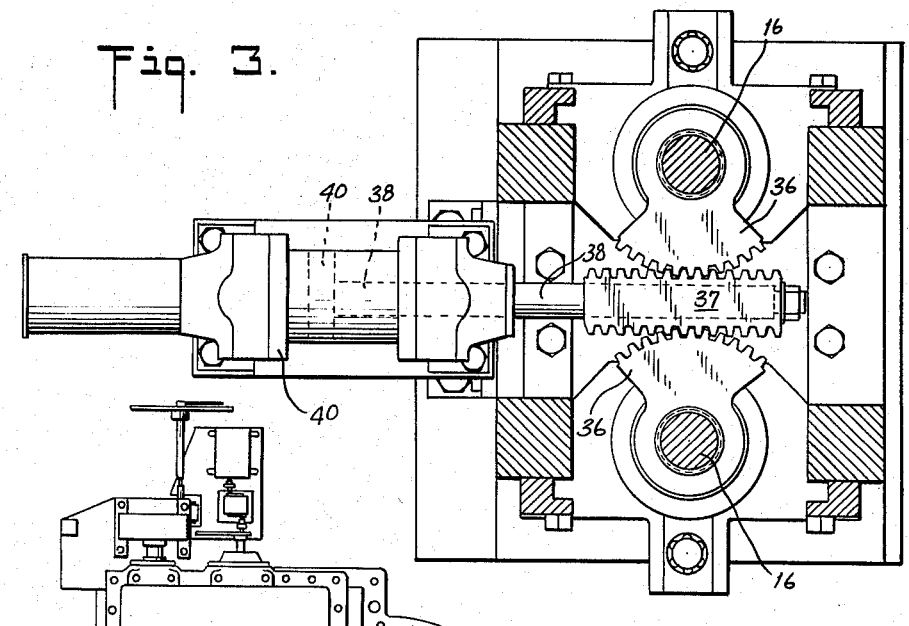
Fig. 3 is a horizontal cross-sectional view taken along the lines 3—3 of Fig. 1.

The apparatus of this invention, as best shown in Figs. 1, 2 and 3, includes rotatable nuts 35 in which the columns 16 are threaded. Rack sectors 36 may be provided connected to the nuts 35. The rack sectors 36 engage a rack 37 which is mounted on piston rod 38 and the latter is connected to a piston 40 mounted for reciprocatory movement in hydraulic cylinder 41 (see Fig. 3).

By movement of the piston 40 in the cylinder 41, a rectilinear movement is imparted to the rack 37, thereby causing the sectors 36 to rotate, such rotation causing rotation of the nuts 35 and a resulting movement of the threaded screw-down columns 16 vertically. The screw-down columns 16 are provided with splines 26 which engage splines provided in the frame member 46. With this arrangement, the screw-down members 16 are prevented from rotating when the nuts 35 are rotated and therefore the screw-down members 16 advance axially through the nuts 35. The nuts 35 act against thrust bearings 45 which are supported on the frame member 46.

The rotation of the sectors 36 will cause the roll adjustment screws or screw-down members 16 to be adjusted rapidly to change the spacing between the rolls 12 and thereby vary the gauge.

Figure 7:
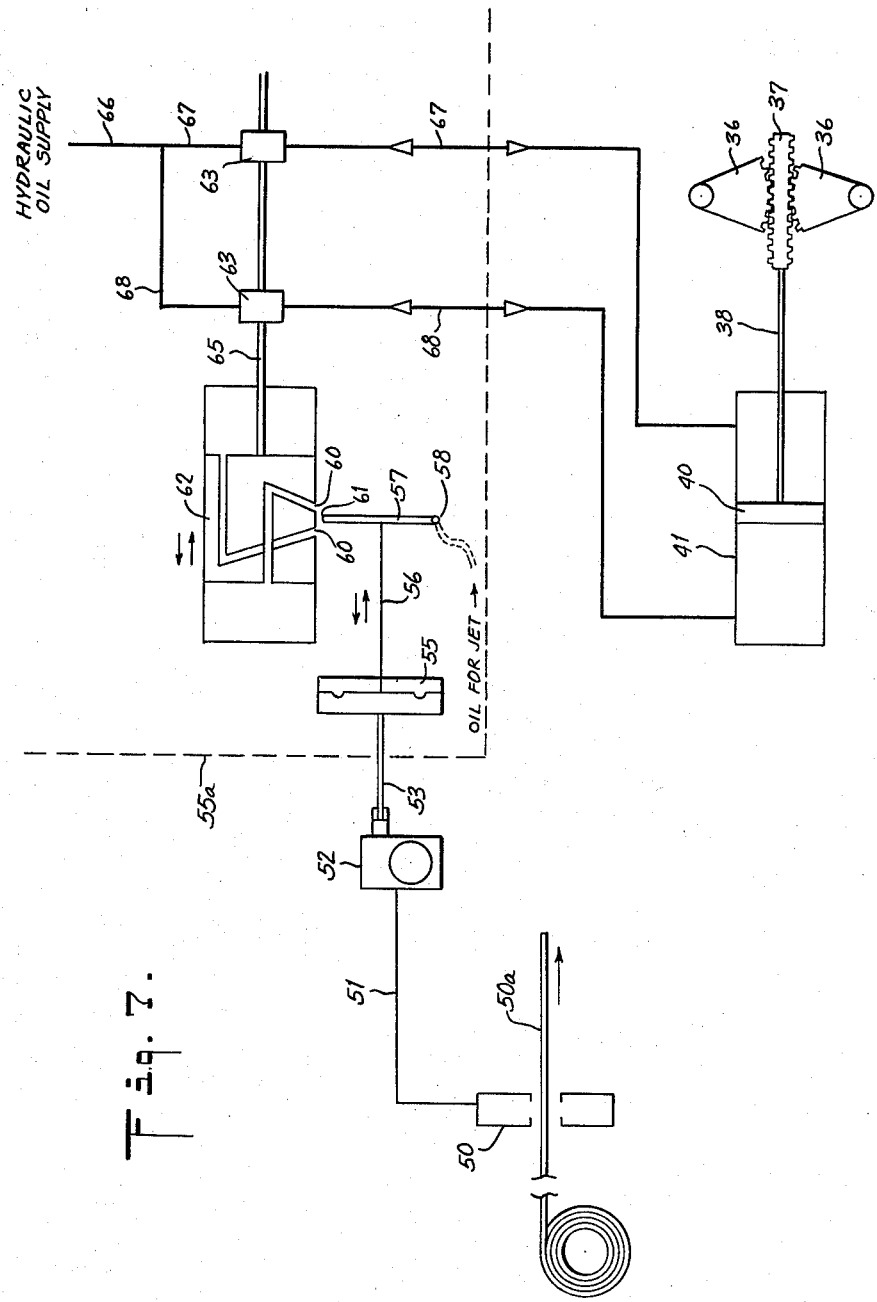
Fig. 7 is a diagrammatic view of a control system for the apparatus of this invention.

The hydraulic cylinder 41 may be actuated by a system which is shown diagrammatically in Fig. 7. The system is energized in response to a signal received from a thickness measuring device 50 which may be of any suitable type such as a non-contact thickness gauge of the X-ray type which is well known and which measures thickness by changes in the density of radiation transmitted through the thickness of the metal strip 50a (e.g. as it leaves the mill rolls, not here shown), although the control circuit shown can be adapted to operate with a contact type thickness gauge (such as the Pratt-Whitney Electrolimit gauge or any other type of thickness gauge having an indicator meter). It is presently preferred to use a non-contact type of gauge which is not subject to mechanical jarring resulting from a rapidly moving strip as would be the contact type of gauge.

Although other control systems (preferably rapid-acting) may be employed to cause response of the piston 40 to signals from the gauge device 50 representing deviation of the rolled work from a desired thickness or range of thickness, the system diagrammatically shown in Fig. 7 represents one example of an arrangement that effectively serves the desired purpose, specifically to constitute the roll adjusting means 36, mill rolls, work and sensing device 50 in a relatively rapid servo-loop for prompt adjustment of the mill roll separation distance so as to keep the rolled strip or sheet within desired limits as to thickness.

In this system, the continuous thickness measuring device 50 transmits the thickness information (e.g. as a suitable electrical signal) through the line 51 to a thickness recorder 52. At the thickness recorder 52 any recording beyond the accepted range will send an impulse (which may be in the form of an electrical signal) through the line 53 to the amplifier 55 to actuate the hydraulic control system, enclosed in the dash line box 55a shown in Fig. 7. This system may be of the type known as the Askania Electrojet, which essentially is an electrohydraulic power amplifier for automatic control systems. The device identified above as the amplifier 55 is shown purely diagrammatically, and may actually comprise (as known for the system 55a and therefore not shown in detail) an electronic amplifier and means such as a phase-controlled torque motor for converting the thickness-deviation signal into longitudinal displacement of a link 56, in a direction corresponding to the direction of thickness deviation. Thus the amplifying and converting unit 55 increases the impulse from the thickness recorder 52 and also displaces the linkage means 56 for operating a jet pipe 57. The jet pipe is pivoted at 58 for limited angular movement. It receives oil under pressure through a hollow vertical bearing at the pivot point (as indicated by the tube 58a in dotted lines) and discharges the oil at high velocity through the jet nozzle 61 at two closely adjacent orifices 60 in a distributor block 62, which is movable like a piston in a cylinder or chamber 62a. When the jet pipe is at its center position, as shown in Fig. 7 of the drawing, it directs the oil flow equally at the two orifices and the static oil pressure recovery is equal at these orifices, but if the tip or nozzle 61 of the jet pipe moves toward one orifice and away from the other, the recovered pressures at the two orifices become unequal. By the movement of the distributor head 62 under the influence of the jet 57, the valve means 63 connected to the piston rod 65 are operated to control the hydraulic oil supply of a booster system so as to direct oil or other non-compressible fluid into the ends of the cylinder 41 through the lines 66, 67, 68 to cause the piston 40 to move in response to changes in the gauge of the metal being continuously measured.

The supply of liquid (e.g. oil) under pressure to the cylinder 41 for the hydraulic drive of the rod 38 is indicated at 66, and such liquid is conducted to the respective ends of the cylinder by the pipes or tubes 67, 68. While the details of the valves 63 are omitted in that they and other elements of the system 55a may be conventional or of otherwise known design, it will be understood that they are conveniently such that in a neutral or center position of the rod 65 liquid flow is cut off from both ends of the cylinder 41, although pressure is maintained in said cylinder, holding the rack 37 stationary, while in displaced positions of the rod to the right or left, liquid flows into one end of the other of the cylinder, respectively, and simultaneously flows out of the opposite end, to move the rod 38 and the rack. At any given position, the piston 40 is held in equilibrium until a signal is received which operates to cause change in said position. It will now be seen that when the jet tube 57 is displaced by a thickness-deviation signal, the device 62 (which in effect follows the jet nozzle 61) moves the valve means 63 to a position where the piston 40 starts moving, the device 62 coming to rest in the displaced position of the nozzle 61. Then by the correction of the rolls (or by other automatic arrangement, perhaps simultaneously with correction) the deviation signal disappears, whereupon the jet tube 61 moves back to its original position (e.g. by positive drive or by spring return) and the following displacement of device 62 restores the valve means to center position, arresting and holding the piston 40 in its adjusted location.

The automatic adjustment apparatus of the invention may be used in conjunction with the conventional screw-down apparatus which includes the screw-down members 15 that are threaded in the fixed nuts or bushings 14. Each of these screws or thrust bolts 15 can be adjusted by any conventional means, for instance manually as by inserting a bar or lever in one of the sockets of the hand wheel or collar 19 fixed at the upper end of each screw 15, so that by turning the screw it is caused to move axially in the fixed bushings 14.

Figure 6:
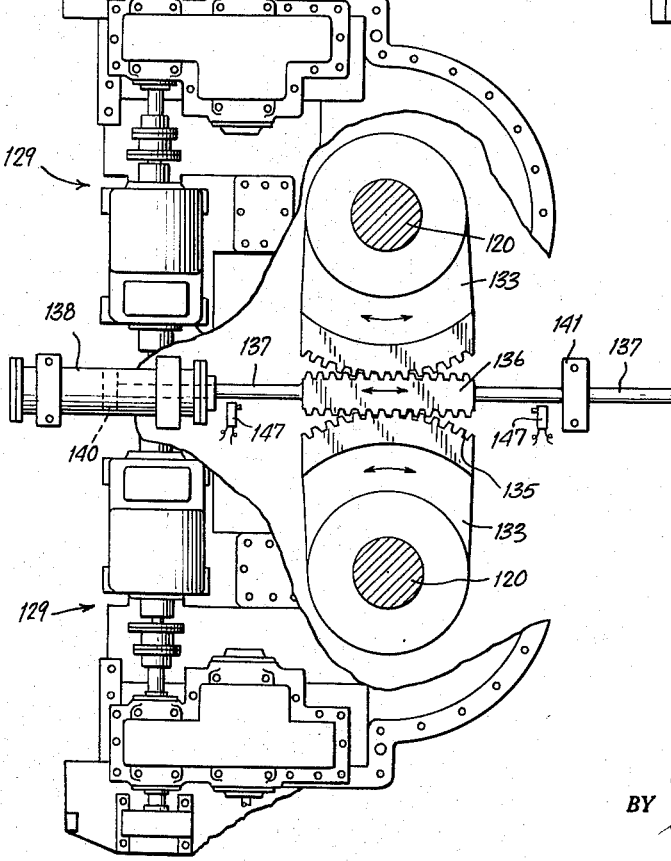
Fig. 6 is a plan view of the adjustment apparatus of this invention as employed in the mill shown in Figs. 4 and 5.
Figure 4:
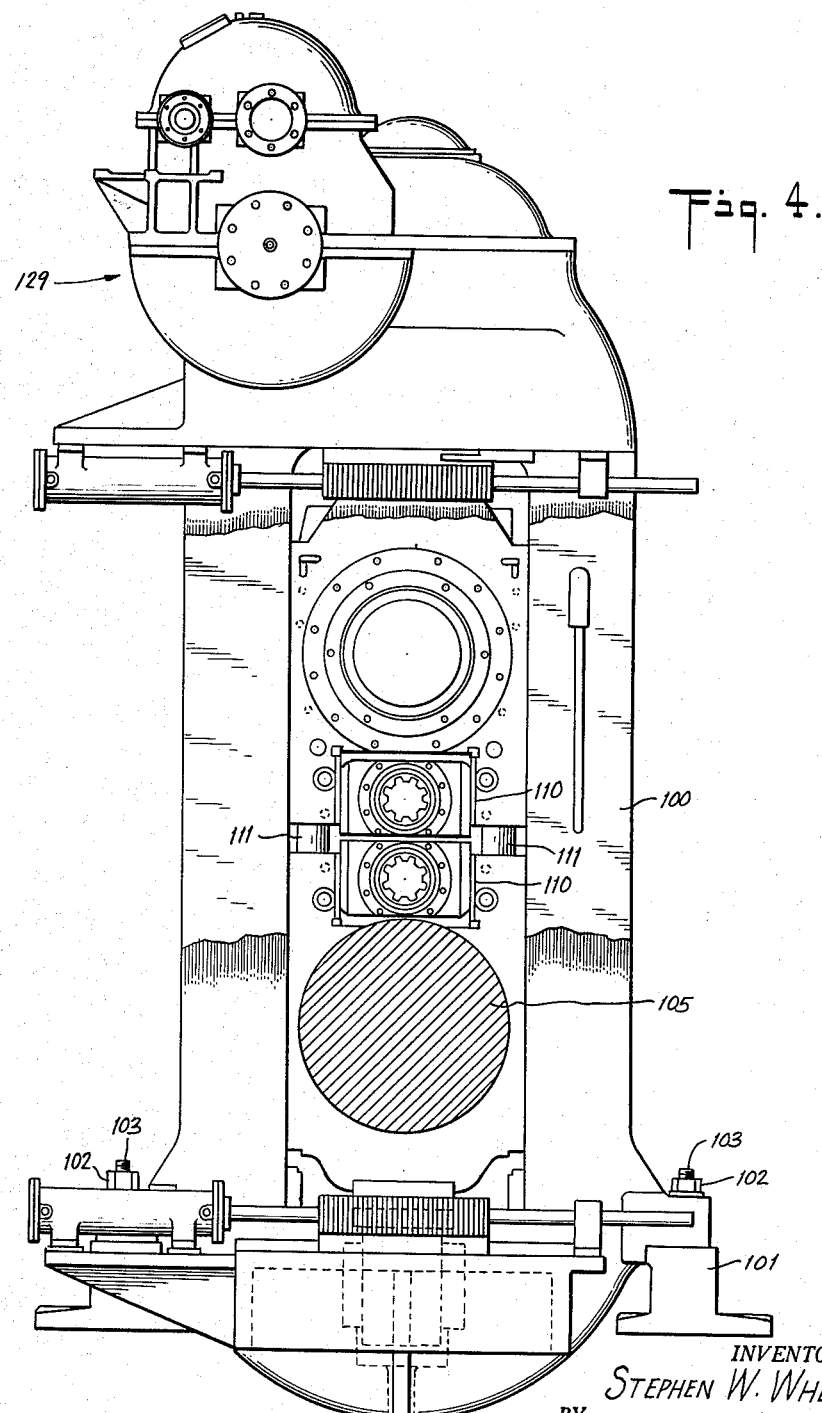
Fig. 4 is a side view of a rolling mill, with parts cut away, showing apparatus embodying the invention included therein.

Figs. 4, 5 and 6 illustrate the application of the invention to both the upper and lower ends of a rolling mill. (Ordinarily sufficient correction is obtained with the use of only one adjustment mechanism located either at the top or bottom of the mill. However, when the gauge variations are extreme, the arrangement shown in Figs. 4, 5 and 6 is desirable.) The rolling mill shown includes the usual mill stand 100 supported on foundation members 101 and held in position by nuts and bolts 102 and 103. The mill also includes backing up rolls 105 and work rolls 106. The necks 105a of the backing rolls are carried in suitable bearing boxes 107 which are slidably mounted in the frame of the mill stand 100 in the usual manner. Similarly, the necks 106a of work rolls 106 are mounted in bearing boxes 108 which are also suitably supported for the vertical movement in the frame elements 110. Compression springs are enclosed in columns 111 to exert a separating force upon the bearing boxes 107 so that when the screw-down pressures are released, the work rolls will separate.

In the mill shown, rapid screw-down apparatus of this invention is provided at the lower part of the mill for exerting a pressure against the bottom or the lower bearing boxes 107. The apparatus includes fixed nut or bushing members 115, adjustable screw members 116 threaded in the members 115 and having integral sector portions 117 in engagement with a rack element 118.

Above the rolls in the upper part of the mill is provided a standard form of screw-down apparatus which, at each side of the roll stand, includes an adjustable screw member or bolt 120 which is splined at 122 to engage corresponding splines 123 in a worm gear 121, so that the member 120 can be turned by the gear. The adjustable screw member 120 at its lower portion 125 is threaded. This lower portion 125 is disposed in threaded engagement with an internally threaded fixed nut or bushing 126. The lower end 127 of the adjustable screw member 120 abuts against the upper bearing box 107. A cup member 128 may be provided to receive the end 127 of the screw member 120. This cup provides a bearing surface to facilitate rotation of the member 120, i.e. sufficiently to suit the occasional adjustments commonly required in this type of screw-down arrangement. The part of the screw-down apparatus just described is of a standard type in which adjustment is effected as follows: The worm gears 121, which are rotated by suitable worms (not shown) under the drive of appropriate power means (indicated generally at 129) cause the splined adjustable screw members 120 to rotate. As each screw member 120 is rotated, it moves vertically in the threaded nut 126, and thus modifies the position of the corresponding roll bearing box or the force exerted on it, as by moving the box downward against the compression springs, or (on upward adjustment of the screw) by reducing the pressure on the bearing box and thus permitting its upward displacement.

In the usual screw-down means the nuts or bushings 126 are fixed. However, in the apparatus of this invention, the nuts are rotatable, i.e., each nut 126 is rotatable in the recess 130 of housing 131, thrust bearings 132 being provided to facilitate its rotation. A sector arm 133 is directly connected to the nut 126, and as shown, may be integral with the nut 126. The sector arm includes sector teeth 135 which mesh with a rack member 136. The arrangement of these parts and the intermeshing of the rack member 136 and the sector teeth 135 is best seen in Fig. 6. The rack 136 is carried on a rod 137 which is a continuation of a piston rod that extends into a hydraulic cylinder 138 and is connected to a piston 140 in the latter.

In order to make slight vertical adjustments in the upper screw-down members 120, the nuts 126 are rotated by actuating the piston 140 in the hydraulic cylinder 138 to cause the rod 137 to move, thereby causing the rack to rotate the nuts through the sectors 133. The rotation of the nuts 126 on the threaded portions 125 of the screw members 120 while those members are held against rotation, by the splines 122 which are in engagement with the splines on the worm gears 121, causes the screw members 120 to move vertically. In this manner, small adjustments can be made without operation of main screw adjustment mechanism.

The outer end of the rod 137 may be suitably supported against transverse displacement by slidably extending through a suitable support member 141.

The piston 140 in the hydraulic cylinder 138 may be controlled and operated in any suitable manner, for example as described in connection with Fig. 7. Thus if automatic control of the thickness of the work is desired (to maintain high dimensional uniformity), a suitable thickness-sensing device is disposed as close as possible to the exit side of the work rolls 106, to measure the thickness of the strip of steel or other metal as it leaves the mill, the system being arranged, as explained hereinabove, to make corrective adjustments of roll position or pressure by the rack 136 when deviations from the intended gauge of the rolled metal are detected. Although such system is found to be very effective in keeping the product within good limits of tolerance, it will be understood that if desired in some cases or for special purposes, a control or supplemental control can also or alternatively be effected by a thickness signal derived from the work as it enters the rolls.

It will be appreciated that when the slight vertical adjustments are made in response to the continuous thickness gauge readings (in a system such as contemplated by Fig. 7), the screw-down members 125 will be moved continuously. These adjustments, usually slight, are readily and rapidly effected by the apparatus of this invention; the vertical changes in the screw-down member are achieved with facility, and can be of small increments. Furthermore, it will be noted that in making the slight adjustments, the screw-down member is not rotated but instead the nut 126 is rotated, causing the screw-down member to move vertically in the splines 123. This vertical movement without rotation is of particular usefulness because in abutting the upper portion of the bearing box 107, the end 127 of the screw-down member 125 does not have to rotate in the cup 128; the frictional losses and wear which would result from frequent rotation of the end 127 in the cup 128 are eliminated.

It will be understood that the internally splined worm gear 121 is effectively prevented from rotating when the nut member 126 is turning, by the engagement of the worm gear with the worm drive (not shown). Therefore, the screw-down member 120 is positively held against rotation when the nut member is turned, and the sole displacement of the screw-down member is in the axial (vertical) direction as desired.

It will also be understood that when the worm gear 121 is rotating the nut member can be prevented from rotation by holding the rack 136 stationary, i.e. because of the engagement of the sector teeth 135 with the rack 136. Hence in such ordinary operation of the conventional screw-down assembly, the screw-down member 120 is caused to rotate with respect to the nut member 126, and is thereby moved axially.

In the usual type of screw-down mechanism, as noted above, the nut 126 is fixed in the housing 131, the fixed nuts being thus held against rotation and also being provided with suitable locking plates or keys at their underside, which were also used to support the nut and the screw member. In the present apparatus, the nuts 126 are free to turn and, therefore, the support arrangement can take the form as shown at the upper end of the screw member comprising a cap 142 which rests on the upper side of the worm gear 121 through which a screw member 143 extends. The screw member 143 is threaded tightly into the upper end of the screw-down member 120 and also carries a washer or collar member 144. A compression spring means 145 may be positioned between the collar 144 and the top of the cap 142. By this means, the screw-down member 120 and the nut 126 on which it is threaded are supported, e.g. against falling when parts below are removed.

In an apparatus such as that shown in Figs. 4, 5 and 6, wherein the adjustment means of this invention is combined with a standard type of screw-down mechanism, it is found useful to make the major adjustments in the positioning of the screw-down members by the operation of the usual screw-down adjustment means, and thereafter use the screw-down adjustment means of this invention to make slight adjustments during operation and to relieve pressure and reapply pressure at the stop and start of the mill operation.

In such as arrangement, the apparatus of this invention may also include limit switches. Referring to Fig. 6, such limit switches may be provided, one in the path of each end of the actuating racks, as shown at 147. The switches may close the mill motor screw-down circuit for operating the regular screw-down system so that when the rack approaches its maximum mill adjustment it contacts the limit switch 147 at that end, the mill screw-down motor is automatically switched on and adjusts the screw-down member; this adjustment is such that the rack and sector members 136 and 133 are or can be put back into the operating range of the automatic control. By the linking of the two mechanisms in this manner, the device is completely automatic over the full range of adjustment of either mechanism. During the adjustment of the main screw-down mechanism, after it has been set in operation by the limit switch 147, the rack and sector members will return to their normal position in response to the automatic hydraulic control, inasmuch as the main screw-down mechanism has effected a gauge adjustment. By this displacement of the rack away from the limit switch, the latter is restored to its off position, interrupting (as then desired) the further adjustment of the main screw-down mechanism.

Figure 8:
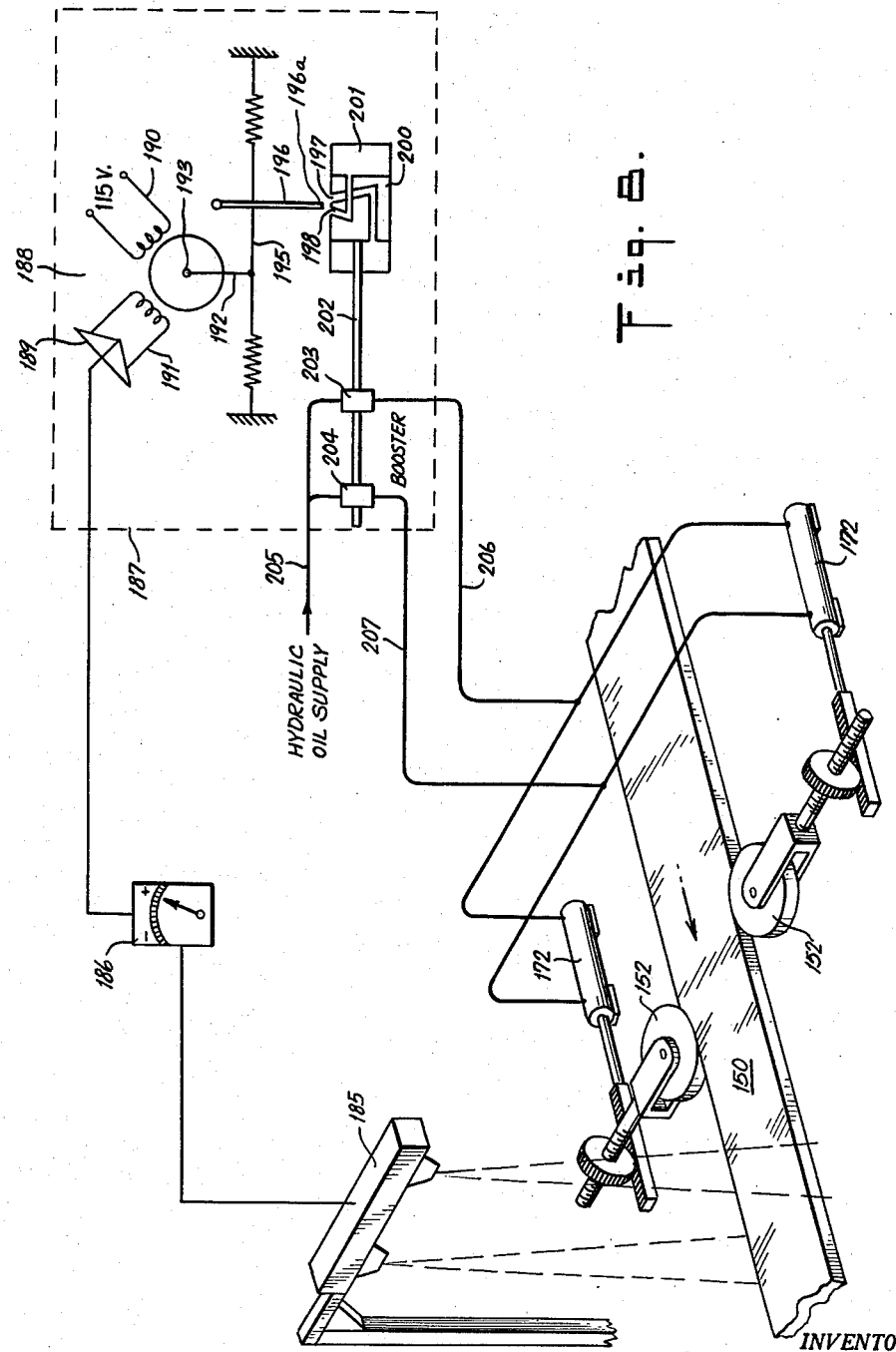
Fig. 8 is a schematic view of an alternate form of the invention for controlling the width of metal bar.

Figs. 8, 9 and 10 illustrate an application of the invention to an apparatus for controlling the width of metal strip which is being rolled. In this system, which is shown schematically in Fig. 8, the strip 150 passes between edger rolls 152 which control the width of the strip. One or both of these rolls may be provided with means for adjusting the rolls toward and away from each other horizontally. The usual means of adjusting such rolls is a horizontally adjustable screw member 153, as best shown in Fig. 9. The screw member is provided with splines 155 which mesh with internal splines 156 of a spur gear 157. The horizontal screw member 153 is also provided with a threaded portion 158 which meshes with the internally threaded nut member 160. To make the usual screw adjustments, the screw member 153 is moved horizontally by rotation of shaft 161 by suitable power means. Spur gear 162 is mounted for rotation with shaft 161 and meshes with spur gear 157, so that the screw member 153 which is splined in the spur gear 157 is caused to rotate with the rotation of spur gear 157. As the screw member 153 turns, it moves horizontally through the internally threaded nut member 160. The end 163 of the screw member 153 abuts the journal box 165 in which the necks 166 of the edger rolls 152 are rotatably mounted. The journal box 165 is slidably mounted in a keyway 167 for horizontal movement toward or away from the edge of the strip 150.

In order to make rapid changes in the horizontal position of the screw member 153 and thereby adjust the rolls horizontally, the additional adjustment means of this invention are provided which include gear teeth 168 provided on the outer periphery of the nut member 160. These teeth intermesh with rack 170 which is connected to a piston rod 171. Piston rod 171 extends into hydraulic cylinder 172 and is connected to piston 173. The hydraulic cylinder 172, as shown in Fig. 10, is provided with fluid connections 175 and may be mounted on frame member 176. The raised portion 177 of the frame member 176 provides a platform on which the rack 170 is slidably supported. The platform 177 also insures positive engagement of the teeth of the rack with the teeth 168 of the nut 160. By movement of the rack 170 the teeth 168 rotate the nut member 160 and thereby cause the screw adjustment member 153 to move horizontally.

In Fig. 9, the adjustment means has only been shown on the right hand side of the strip. The same type of apparatus may be employed on the left side of the strip, if it is desired to make adjustments from both sides.

Referring now to Fig. 8, rapid adjustment can be made in the separating distance between the rolls 152 by operation of the rack member through suitable control and actuating means, such as the hydraulic system there shown. For example, if it is desired to obtain accurate and continuous control of the width of the strip 150 and to make minor adjustments continuously to maintain the desired width, a known non-contact type of width gauge such as that shown at 185 may be used. Width gauge 185, as will be understood, provides a voltage signal which may be proportional to the amount over or under normal width. This voltage signal is carried to amplifier 189. A volt meter 186 may be provided in the line from the width gauge so that changes in the voltage signal may be observed by the operator.

At the amplifier 189, the signal may be amplified for actuating the hydraulic system by suitable means 187 such as the system described above in connection with Fig. 7. A variation of this control system, known as the Askania Electro Jet, is here set forth in detail. It comprises a two-phase induction type torque motor 188, which is so connected and arranged that when a reference A.C. voltage is imposed on one phase winding 190 (e.g. 115 volts), and a signal A.C. voltage 90° out of phase with the reference voltage is imposed on the other phase winding 191, the resulting torque is a direct function of the difference between the voltages. As a consequence, variation in the signal voltage from 186 causes a corresponding variation in the torque. A lever arm 192 on the motor shaft 193 converts this torque into linear force. A push pin 195 applies this force to a hydraulic jet pipe 196, which may be a pivoted tube that is free to move through an angle of about 1°. It receives oil under pressure through a hollow bearing and discharges the oil at high velocity through its nozzle 196a at two closely adjacent orifices 197, 198 in a distributor block 200. When the jet pipe is at its center position, it directs the oil flow equally at the two orifices 197, 198 and the static oil pressure recovery is equal at the two orifices. However, when the tip of the jet pipe moves toward one orifice and away from the other, the recovered oil pressures at the two orifices become unequal which causes the distributor block to move in cylinder 201. Piston rod 202 which is connected to distributor block 200 operates the valves 203, 204 to control the flow of hydraulic fluid from the supply line 205 through the lines 206, 207 to actuate hydraulic cylinders 172.

It will be understood that the amplifier 189 is such as to convert the width deviation signal from the gauge 185 to a corresponding voltage (A.C.) which is 90° out of phase with the reference voltage on winding 190, in a direction corresponding to the direction of the deviation from standard strip width or range of width. The nature and arrangement of the valves 203, 204 and the mode of operation of the system 187 for causing corrective adjustment of the rolls 152 in response to dimensional deviation of the rolled work from the predetermined standard, may be essentially as described above relative to the adjustment of rack 37 in Fig. 7 in response to dimensional (thickness) variations detected by the device 50.

As noted above, the width of the strip 150 can be controlled by one cylinder on either side and it can also be controlled simultaneously by two cylinders, one on each side, as depicted in Fig. 8. The two cylinder arrangement increases the amount of available rapid adjustment and has been found advantageous because by limiting the amount of adjustment on each side, the strip 150 can be kept on the center line of the mill table and the width gauge.

It will be appreciated that the control system of this invention has the further advantage of enabling rapid unloading of the mill, for example by appropriate supplemental control of the hydraulic cylinders 40, 140, or 172.

The control system of this invention is applicable to hot rolling as well as cold, and to rolling of various types of metal. However, in some cases the control does not appear to be as useful in controlling the gauge on a hot mill, since the normally encountered variations in temperature can often result in such a difference in gauge when measured after the strip is cooled that this effect may overshadow any attempt to control thickness in the hot condition. On the other hand, edge rolling is confined almost exclusively to hot rolling operations, it being impractical to edge roll the thin gauge stock usually encountered in cold rolling practice.

Although the apparatus of this invention has been illustrated as applied for adjusting the separating distance and roll pressure in four-high rolling mills and in an edging mill, it will be appreciated that the invention can be employed effectively in other types of mills such as two-high mills and in other applications in which it is desired to change the separating distance or the pressure between work members.

In the operation of the thickness control mechanism of this invention, the control has been operated to continually effect corrections where the variation from the norm is within 0.0003 inch. In certain practice, it may be found that such close control is unnecessary and effective gauge control can be obtained by permitting slight variations without correction. For example, a deadband in the control could be provided to accomplish this purpose so that slightly larger variations would be tolerated.

Where more than one mill is used, for example, in a tandem rolling operation, and the sheet passes successively through a first and second stand, it is only necessary to provide an automatic screw-down control on the first or entering stand. The positioning of the control on the first stand is desirable because the strip when it enters the first stand is relatively soft, i.e. annealed, at this stage; the roll forces are relatively small and the adjustment is accomplished more easily. Also, once a sheet is brought to a uniform desired gauge, the succeeding reductions can usually be completed without substantially disturbing the uniformity of the gauge.

It will be understood that many mechanical variations can be made in the existing apparatus without departing from the scope of the invention. For example, although the adjusting nut and its connecting sector turn on a threaded screw-down member, the same effect could be obtained by having the nut ride on a cammed surface of the mill housing in such a manner as to force the rolls together or relieve the setting thereof. Also, although a system of levers connected to the ends of the nut arms could be employed instead of the rack and sector arrangement, it is presently preferred to employ the means which are shown in the drawings and described hereinabove.

In general, the sector gears are designed for about one-sixth turn of the nut to effect the full range adjustment for the screw-down members. It will be appreciated that the design could be made to provide more or less adjustment. However, with other suitable means for making the adjustments for the initial mill setting, roll leveling, and other such adjustments by a conventional screw-down means, the adjustment mechanism of this invention can be used for the slight gauge adjustments during the operation of the mill. In Figs. 4, 5 and 6, two adjustment means of this invention have been shown both above and below the mill. Under some conditions, it will be sufficient to provide (for the slight variations needed in thickness control) only one adjustment means of the present invention at the upper part of the mill, with the usual screw-down mechanism, so as to effect all adjustments from above. However, it may be desirable and necessary to use both the lower and upper gauge adjustment means in the same mill as shown in Figs. 4, 5 and 6 when gauge variations are extreme, and require considerable adjustment.

It will be noted that the apparatus of this invention may be added to existing equipment with only minor changes in the arrangement of the latter. For example, in Fig. 5, the screw-down mechanism shown in the upper part of the mill is essentially unchanged by the addition of the apparatus of this invention, the changes merely consisting of: making the nuts 126 rotatable and attaching to them sector arms 133; the provision of antifriction thrust bearings 132 at the upper ends of the nuts 126; changing the hand of the thread of one of the mill screw-down members so that it is opposite to the other (the threads are usually of the same hand in conventional structures) in order that the sectors may turn the nuts in the opposite direction in response to the rack and thus move both members axially in the same direction; the addition of the hydraulic cylinder and rack with suitable supports for the hydraulic cylinder and the provision of the means for supporting the screw-down members from above, i.e. elements 142 to 145.

From the foregoing description, it will be seen that this invention achieves the objects of providing improved means for maintaining the separating distance between the rolls constant by continuously correcting for any changes in the roll spacing, such corrections being effected almost simultaneously with the passage of the work through the mill. It will also be noted that the invention achieves the object of permitting rapid release of roll pressure after stopping and the rapid resetting of the rolls upon the starting of the mill; that such apparatus can be operated by a separate hydraulic means, and does not rely upon the relatively slower operation of the usual adjustment means; and that the whole adjustment system may be automatically operated.

When using the apparatus of this invention for rapid loading and unloading of a rolling mill, the mill roll drive motors may be started before the load is applied and as soon as the motors have started to turn, the load can be quickly applied. By this means the starting torque required when restarting a mill which has been stopped during rolling may be greatly reduced. Present mill motors and drives have had to be specified large enough to start under load to avoid loss of product due to rolling off gauge while the slow acting conventional mill screw-down devices are resetting the mill. With the apparatus of this invention which permits rapid resetting of the mill rolls, there is practically no loss of product rolled off gauge, and the mill drives do not have to be designed oversize for high starting torque. Thus, there are savings in initial mill cost and in mill drive maintenance costs.

The fact that adjustments can be made continuously with apparatus of this invention is of great advantage in obtaining a uniform product because in practice there generally is no sudden change in strip gauge but rather it changes gradually (e.g. due to the varying temperature at which the strip was previously rolled on the hot mill). The continuous adjustment means is most effective in correcting roll spacing changes resulting from such gradual changes in gauge.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. A rolling mill comprising work rolls, chocks therefore, a screwdown acting on the chocks of one of said rolls for making a coarse adjustment of the pass between said rolls, means concentric with said screwdown and rotatable with respect thereto for axially moving the chocks of one of the said rolls for making a fine adjustment of said pass, high torque, low inertia means having an extension leverage and movable through a small arc and acted on by said leverage for rotating said first means through a partial revolution, double acting fluid operated piston and cylinder means acting on said leverage and moving said second means, a thickness gauge and means operated by said thickness gauge for directly controlling said piston and cylinder means.

2. Apparatus according to claim 1 further including power means for actuating said screwdown whereby said coarse adjustment may be made under remote control, said extension leverage having a normal range of movement, control means actuated upon said leverage reaching one end of its normal range of movement to motivate said power means in one direction, and control means actuated by said leverage upon movement thereof to the opposite end of its normal range of movement to motivate said power means in the opposite direction.

3. Apparatus according to claim 1 further including conduit means and a source of supply of fluid under pressure to maintain a continuous supply of fluid under pressure in the opposite ends of said cylinder, and said means operated by said thickness gauge comprising means to rapidly vary the volumes of fluid in the opposite ends of said cylinder.

4. A rolling mill comprising work rolls, chocks therefor, a screwdown acting on the chocks of one of said rolls for making a coarse adjustment of the pass between said rolls, means concentric with said screwdown and rotatable with respect thereto for axially moving the chocks of one of the said rolls for making a fine adjustment of said pass, high-torque, low-inertia means having an extension leverage and movable through an arc and acted on by said leverage for rotating said first means through a partial revolution, double-acting fluid operated piston and cylinder means acting on said leverage and moving said second means, means to maintain fluid under pressure in the opposite ends of said cylinder means, and control means to quickly vary the volumes of fluid in the opposite ends of said cylinder.

5. In combination with a rolling mill for rolling strip and the like having a pair of working rolls disposed on opposite sides of the path of strip travel defining a gauge reducing pass and having roll adjusting means for initially setting the space between said working rolls to produce an expected reduction in gauge of the strip passing therethrough in a continuous manner; the improvement comprising a secondary roll adjusting means, said secondary roll adjusting means comprising mutually threaded members operative upon relative rotation to move one of said working rolls toward or away from the other of said working rolls, a pair of said mutually threaded members positioned adjacent each end of said one of said working rolls, one of each said pairs of said mutually threaded members having an arcuate rack sector thereon, said rack sectors being disposed in adjacent spaced relation with respect to each other, a double rectilinear rack interposed between and meshing with said rack sectors, driving means connected to said double rack for longitudinally moving the same, said driving means comprising double-acting fluid cylinder means for rotating one of said mutually threaded members, said driving means being independent of said first mentioned roll adjusting means, sensing means continuously and uninterruptedly measuring the gauge of the strip issuing from said working rolls, means to continuously and uninterruptedly vary the volumes of fluid in opposite ends of said cylinder means in response to said sensing means to actuate said driving means during rolling whereby said secondary roll adjusting means superimposes a fine adjustment on the initial setting of said working rolls as determined by said first mentioned roll adjusting means to maintain the gauge of the strip issuing from said working rolls within close limits.

6. In combination with a rolling mill for rolling strip and the like having a pair of working rolls disposed on opposite sides of the path of strip travel defining a gauge reducing pass and having roll screwdowns for initially setting the space between said working rolls to produce an expected reduction in gauge of the strip passing therethrough in a continuous manner; the improvement comprising a secondary roll adjusting means adapted to superimpose a fine adjustment on the initial setting of said working rolls as determined by said screwdowns to maintain the gauge of the strip issuing from said working rolls within close limits, said secondary roll adjusting means comprising mutually threaded members concentric with the axes of said screwdowns and operative upon relative rotation to move one of said working rolls toward or away from the other of said working rolls, high-torque low-inertia driving means having an extension leverage movable through an arc for rotating one of said mutually threaded members, double-acting fluid cylinder means connected to said leverage, sensing means continuously and uninterruptedly measuring the gauge of the strip issuing from said working rolls, control means operated by said sensing means continuously and uninterruptedly actuating said fluid cylinder means during rolling said secondary adjusting means having a limited range of movement, and means to actuate said screwdowns when said secondary adjusting means moves outside said range to enable said secondary means to resume control of the setting of the mill.

7. In combination with a rolling mill for rolling strip and the like having a pair of working rolls disposed on opposite sides of the path of strip travel defining a gauge reducing pass and having roll screwdowns for initially setting the space between said working rolls to produce an expected reduction in gauge of the strip passing therethrough in a continuous manner; the improvement comprising a secondary roll adjusting means, said secondary roll adjusting means comprising mutually threaded members concentric with the axes of said screwdowns and operative upon relative rotation to move one of said working rolls toward or away from the other of said working rolls, driving means comprising extension leverage movable through an arc and connected to one of the mutually threaded members, by double-acting fluid cylinder means acting on said leverage for rotating one of said mutually threaded members, said driving means being independent of said roll screwdowns, means to continuously and uninterruptedly indicate the gauge of the strip issuing from said working rolls, means to continuously and uninterruptedly vary the volumes of fluid in opposite ends of said cylinder means in response to said indicating means to actuate said driving means during rolling, said secondary roll adjusting means superimposing a fine adjustment on the initial setting of said working rolls as determined by said screwdowns to maintain the gauge of the strip issuing from said working rolls within close limits.

References Cited in the file of this patent

UNITED STATES PATENTS

| | | | |
|---|---|---|---|
| 412,852 | Kennedy et al. | Oct. 15, | 1889 |
| 444,389 | Aiken | Jan. 6, | 1891 |
| 565,512 | Schuhmann | Aug. 11, | 1896 |
| 608,287 | Hodgson | Aug. 2, | 1898 |
| 669,241 | Hodgson et al. | Mar. 5, | 1901 |
| 669,242 | Hodgson | Mar. 5, | 1901 |
| 1,537,240 | Lewis | May 12, | 1925 |
| 1,814,354 | Webster et al. | July 14, | 1931 |
| 1,913,361 | Burns | June 13, | 1933 |
| 1,990,051 | Schreck | Feb. 5, | 1935 |
| 2,132,338 | Ziebolz | Oct. 4, | 1938 |
| 2,194,078 | Simonds | Mar. 19, | 1940 |
| 2,247,301 | Lesser | June 24, | 1941 |
| 2,406,219 | Hight et al. | Aug. 20, | 1946 |
| 2,610,801 | Miller | Sept. 16, | 1952 |
| 2,653,247 | Lundahl | Sept. 22, | 1953 |
| 2,796,781 | Mills | June 25, | 1957 |

FOREIGN PATENTS

| | | | |
|---|---|---|---|
| 721,951 | Germany | June 24, | 1942 |
| 647,606 | Great Britain | Dec. 20, | 1950 |